United States Patent
Huggett

(10) Patent No.: US 7,907,185 B2
(45) Date of Patent: Mar. 15, 2011

(54) LENS CORRECTION LOGIC FOR IMAGE SENSORS

(75) Inventor: Anthony Huggett, Basingstoke (GB)

(73) Assignee: Aptina Imaging Corporation, Grand Cayman (KY)

( * ) Notice: Subject to any disclaimer, the term of this patent is extended or adjusted under 35 U.S.C. 154(b) by 675 days.

(21) Appl. No.: 11/778,532

(22) Filed: Jul. 16, 2007

(65) Prior Publication Data

US 2009/0021632 A1    Jan. 22, 2009

(51) Int. Cl.
H04N 5/228    (2006.01)

(52) U.S. Cl. .................... 348/222.1; 348/335

(58) Field of Classification Search ............... 348/222.1, 348/335
See application file for complete search history.

(56) References Cited

U.S. PATENT DOCUMENTS

| | | | |
|---|---|---|---|
| 5,434,902 A | 7/1995 | Bruijns | |
| 6,937,282 B1 | 8/2005 | Some et al. | |
| 7,023,472 B1 | 4/2006 | Kang et al. | |
| 2002/0025164 A1 | 2/2002 | Suzuki | |
| 2003/0031375 A1 | 2/2003 | Enomoto | |
| 2003/0234864 A1 | 12/2003 | Matherson et al. | |
| 2004/0125227 A1 | 7/2004 | Tsuruoka et al. | |
| 2004/0155970 A1 | 8/2004 | Johannesson et al. | |
| 2004/0257454 A1 | 12/2004 | Pinto et al. | |
| 2005/0122400 A1 | 6/2005 | Kochi et al. | |
| 2005/0162531 A1 | 7/2005 | Hsu et al. | |
| 2005/0179793 A1 | 8/2005 | Schweng | |
| 2005/0270402 A1 | 12/2005 | Nikkanen et al. | |
| 2006/0125945 A1 | 6/2006 | Suzuki et al. | |
| 2006/0204128 A1 | 9/2006 | Silverstein | |
| 2007/0033999 A1* | 2/2007 | Bothe et al. | .................. 73/118.2 |
| 2009/0090868 A1* | 4/2009 | Payne | ..................... 250/363.06 |

FOREIGN PATENT DOCUMENTS

| | | |
|---|---|---|
| JP | 63-048982 | 3/1988 |
| JP | 3-053674 | 3/1991 |
| JP | 2000-004351 | 1/2000 |

(Continued)

OTHER PUBLICATIONS

Miller et al., "Hardware Considerations for Illumination-Invariant Image Processing," Proc. SPIE vol. 2347, p. 290-300, Machine Vision Application, Architectures, and Systems Integration III; Oct. 1994.

(Continued)

Primary Examiner — David L Ometz
Assistant Examiner — Antoinette T Spinks
(74) Attorney, Agent, or Firm — Kramer Levin Naftalis & Frankel LLP

(57) ABSTRACT

Methods of calibrating a pixel correction function for compensating for vignetting in an optical device include exposing an optical device to a reference object in order to generate pixel data of at least part of an image of the reference object. A pixel correction function is provided including a first number of unknown constant values. Pixel data of a second number of sample points is provided from the pixel data of the at least part of the image. The second number is equal to the first number or the first number plus one. The constant values are determined using the pixel data of the second number of sample points. The method allows a pixel correction function to be calibrated with a small number of sample points, thereby simplifying calibration processes for individual optical devices, and thus reducing the manufacturing costs.

20 Claims, 6 Drawing Sheets

FOREIGN PATENT DOCUMENTS

| KR | 900002696 B | 4/1990 |
| KR | 2004-0088830 | 10/2004 |
| WO | WO 2006/028876 A1 | 3/2006 |

OTHER PUBLICATIONS

W. Yu "*An Embedded Camera Lens Distortion Correction Method for Mobile Computing Applications*," IEEE Transactions on Consumer Electronics, vol. 49, No. 4, Nov. 2003, pp. 894-901.

W. Yu, "*Practical Anti-vignetting Methods for Digital Cameras,*" IEEE Transactions on Consumer Electronics, vol. 50, No. 4, Nov. 2004, pp. 975-983.

W. Yu et al., "*Vignetting Distortion Correction Method for High Quality Digital Imaging*," IEEE Computer Society, Proceedings of the 17$^{th}$ International Conference on Pattern Recognition (ICPR'04) vol. 3, pp. 666-669 (Aug. 23-26, 2004).

\* cited by examiner

LENS CORRECTION LOGIC FOR IMAGE SENSORS

BACKGROUND OF THE INVENTION

1. Field of the Invention

Embodiments of the invention relate to optical devices, and more particularly to optical devices including digital imagers.

2. Description of the Related Art

Optical devices suffer from a position-dependent light intensity variation termed "vignetting." Vignetting refers to an effect where an image is brighter towards the center of the image and fades towards the edges thereof. Vignetting is typically caused by characteristics of optical lenses of an optical device, which results in an uneven distribution of light intensity on the optical field (e.g., film or image sensor array) of the optical device.

Digital optical devices also suffer from vignetting. Digital optical devices typically include a lens system and an image sensor (or imager) that digitally captures images. Vignetting is particularly acute in low-cost digital optical devices that use an inexpensive optical lens, and have a relatively short distance between the lens and the image sensor thereof. When digital optical devices are in use, pixel data (e.g., luminance data) of a captured image can be processed to restore the brightness of the image, thereby compensating for vignetting in the digital optical devices. For example, pixel data can be multiplied by position-dependent gains to restore the brightness to the correct level. In some arrangements, look-up tables are employed to provide position-dependent gains across an array of pixels. However, such look-up tables need a large amount of memory, which increases the manufacturing costs.

To minimize memory requirements, pixel correction functions have been used for compensating for vignetting. Pixel correction functions typically provide position-dependent gains such that pixel data from pixels near edges of an image sensor array are multiplied by a larger correction gain than data from pixels near the center of the array. Various functions have been proposed as pixel correction functions, including polynomial functions, exponential functions, trigonometric functions, and hyperbolic cosine functions. Such pixel correction functions need to be calibrated for the position of the optical lens relative to the image sensor array in each individual digital optical device. The calibration process can be performed for individual digital optical devices during or after the manufacturing process. It would therefore be advantageous to provide a simplified calibration process for digital optical devices.

BRIEF DESCRIPTION OF THE DRAWINGS

The embodiments will be better understood from the Detailed Description of the Embodiments and from the appended drawings, which are meant to illustrate and not to limit the embodiments, and wherein.

DETAILED DESCRIPTION OF EMBODIMENTS

In one embodiment, a method of calibrating a pixel correction function for compensating for vignetting in a digital optical device is provided. The digital optical device can be any optical device configured to digitally capture images, including, but not limited to, digital still cameras, digital video camcorders, film still cameras with digital image capturing features, and analog video camcorders with digital image capturing features. The optical device can include imagers of any suitable type, for example, CCD imagers or CMOS (semiconductor) imagers.

Figure 1:
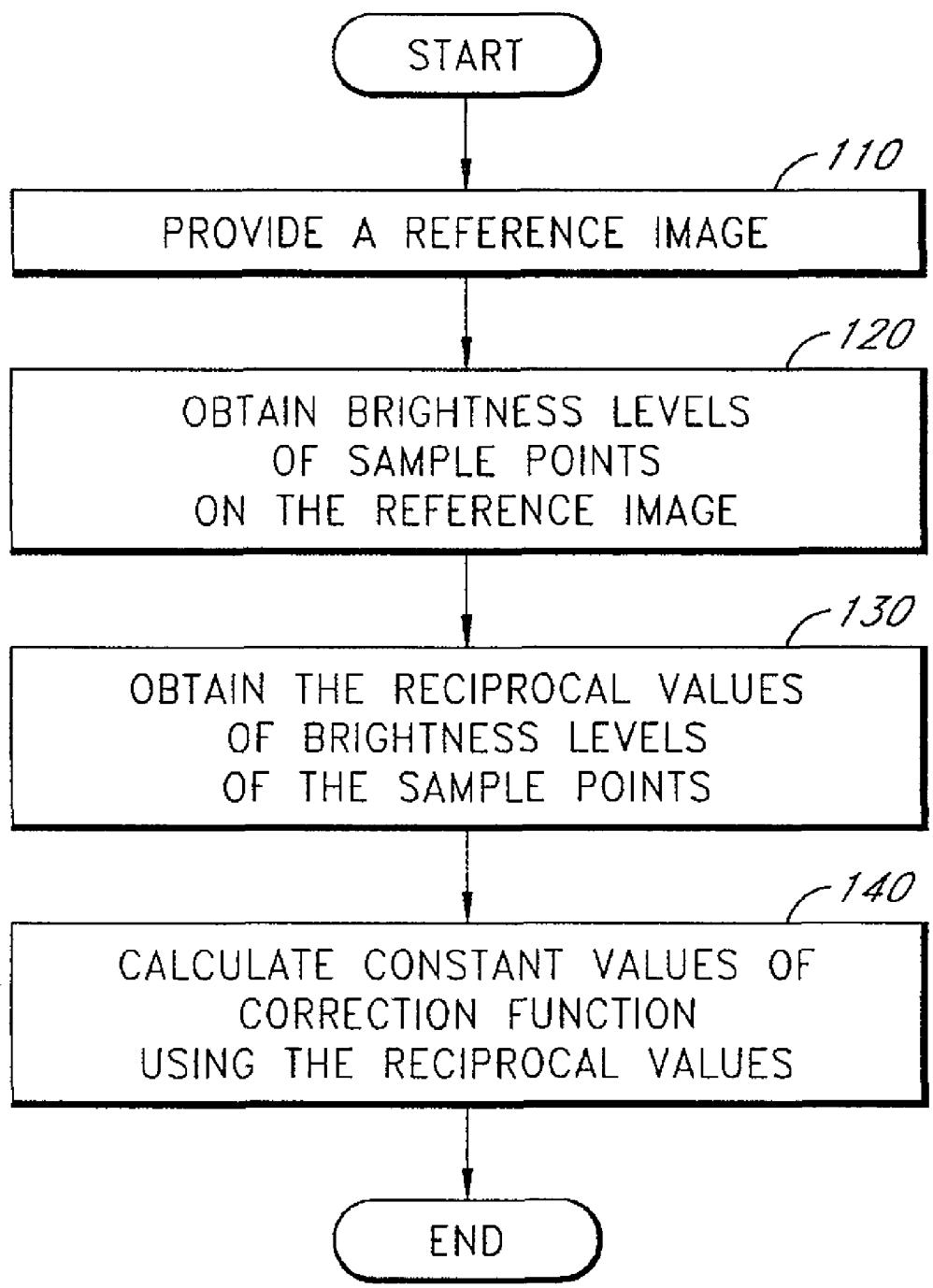
FIG. 1 is a flowchart illustrating a process of calibrating a pixel correction function for compensating for vignetting in a digital optical device in accordance with one embodiment.

FIG. 1 illustrates a process for calibrating a pixel correction function for an optical device according to one embodiment. An optical device can employ a pixel correction function including a first predetermined number of unknown constant values. In one embodiment, in order to determine the constant values in an anti-vignetting calibration process for the optical device, the optical device is exposed to a reference object in order to provide a reference image. A second predetermined number of sample points are selected from the reference image for determining the unknown constant values. In one embodiment, the second predetermined number is greater than the first predetermined number by one (1). In another embodiment, the second predetermined number is equal to the first predetermined number. This method simplifies the calibration process, and thus reduces the manufacturing costs.

In one embodiment, an imager uses a function of the product of two hyperbolic cosine functions as a pixel correction function. The pixel correction function serves to provide two-dimensional position-dependent gains for vignetting correction. The pixel correction function is configured to provide gains that approximate correction across the optical field of an imager.

The pixel correction function can include a horizontal component $g(x)$ for gains along the horizontal (x) direction of the optical field. The horizontal component $g(x)$ can be represented by Equation 1.

$$g(x) = \cos h(s_x(x - c_x)) \tag{1}$$

In Equation 1, $s_x$ is a constant horizontal scaling factor in the x direction and $c_x$ is a constant horizontal center value in the x direction.

The pixel correction function can also include a vertical component $g(y)$ for gains along the vertical (y) direction of the optical field. The vertical component $g(y)$ can be represented by Equation 2.

$$g(y) = \cos h(s_y(y - c_y)) \quad (2)$$

In Equation 2, $s_y$ is a constant vertical scaling factor in the y direction and $c_y$ is a constant vertical center value in the y direction.

The pixel correction function is the product of the horizontal component g(x) of Equation 1 and the vertical component g(y) of Equation 2, which provides two-dimensional gains for vignetting correction. The pixel correction function is represented by Equation 3.

$$g(x,y) = g(x)g(y) = \cos h(s_x(x - c_x)) \cos h(s_y(y - c_y)) \quad (3)$$

The constant values $s_x$, $s_y$, $c_x$, and $c_y$ are unknown and can be determined by a calibration process so that the function can correct for vignetting for the configurations of the lens and imager sensors of a digital optical device.

In one embodiment, the constant values of Equation 3 can be determined by the observation of a predetermined number of selected sample points. Each of the horizontal or vertical components g(x), g(y) of Equation 3 has two unknowns and can be fixed by the observation of three sample points in comparison to known intensity of the image at the sample points. In one embodiment, the constant values can be determined by sampling three points in each dimension, and finding a unique solution of the equation which satisfies the observations. The solution can be arrived at by a closed-form solution (by which at least one solution can be expressed analytically in terms of a bounded number of certain "known" functions) or by an iterative method.

By using one of the sample points for both of the horizontal and vertical components g(x), g(y) of Equation 3, the calibration can be performed with only 5 sample points, while still obtaining a minimum of 3 sample points along each of two intersecting lines. In one embodiment, the sample points can be selected from two intersecting lines. The intersecting lines can be orthogonal and can extend in the horizontal and vertical direction, respectively. At least two of the sample points can have the same value in the vertical or horizontal dimension.

Referring to FIG. 1, a process for calibrating a pixel correction function for an optical device is described below according to one embodiment. The calibration process can be performed during or after the manufacturing process of the optical device as long as the optical device has been equipped with its essential components, i.e., optical lens and image sensors. In the illustrated embodiment, the calibration process can start with providing a reference image (block 110). In one embodiment, the reference image can be provided by capturing an image of a reference object. The capturing of a reference object can be accomplished in numerous fashions depending upon the desired use of the imager.

Figure 2:
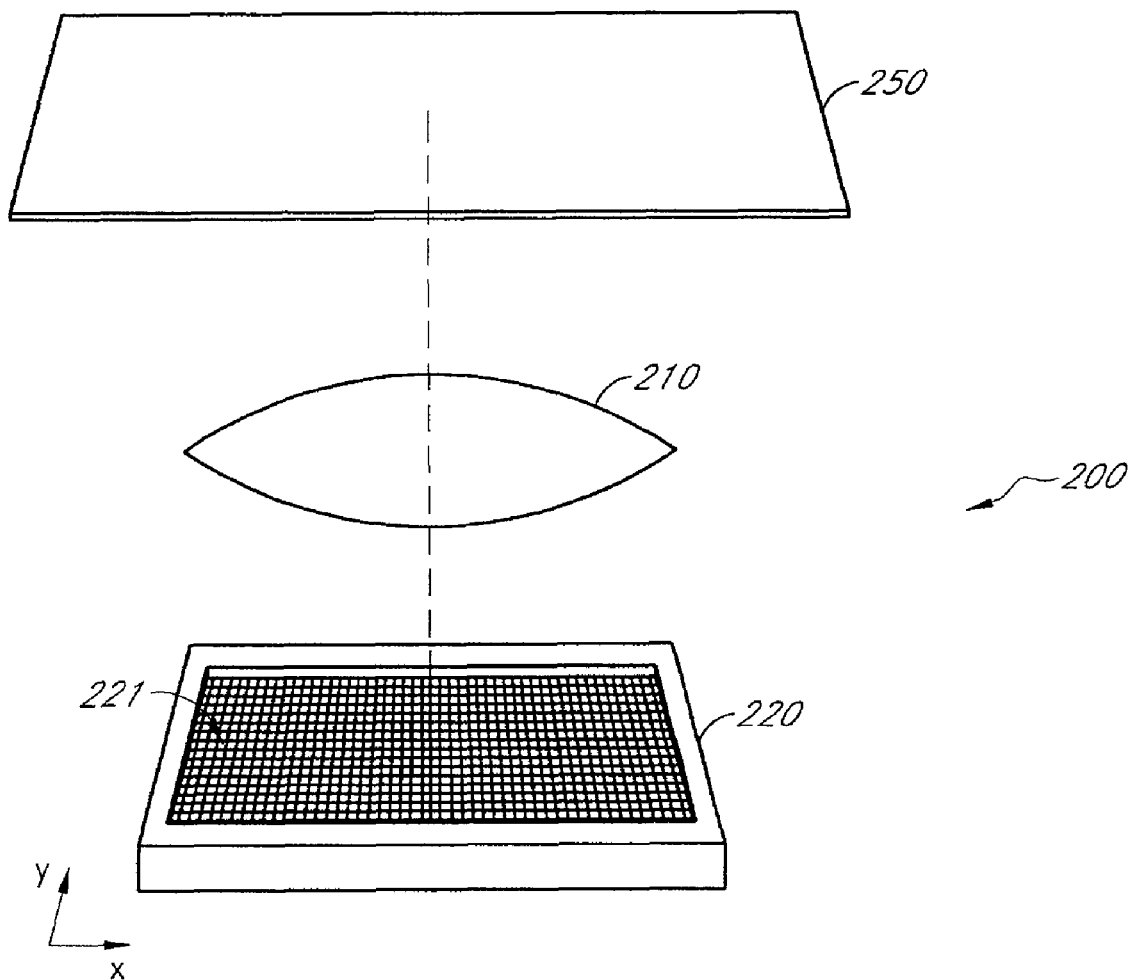
FIG. 2 is a schematic perspective view of a digital optical device set up for taking a reference image in accordance with one embodiment.

In one embodiment, referring to FIG. 2, a reference object 250 is a flat object illuminated with a stationary uniform white light source. In certain embodiments, this step can also be performed in a dark room to avoid ambient light interference. The reference object 250 is aligned to face a digital optical device 200 that includes an optical lens system 210 and an example of an imager 220. The optical lens system 210 can include one lens or a stack of lenses. The imager 220 is on a die and includes an array of image sensors 221 in a matrix form in the illustrated embodiment. It should be noted, however, that although the imager 220 has been shown as an array of image sensors 221, the imager 220 can be represented in numerous other arrangements as well. A reference image of the reference object 250 is captured by the imager 220.

In another embodiment, the calibration process can use a single light source that is moved relative to the imager 220 during the calibration process to illuminate different sample points. In this embodiment, the light source is directed to illuminate one sample point at a time, and a reference image is captured for the one sample point. Then, the light source can be moved or directed to illuminate another sample point with substantially the same intensity of light, and then another reference image is captured for the other sample point. This step is repeated until reference images for all the samples points are captured. Then, the reference images can be processed to provide the brightness levels of the sample points. In some embodiments, the reference images can be consolidated into a single reference image similar to the one captured with the uniform white light source described above. This process does not depend on providing a uniform flat image as big as the imager; rather a single light emitting diode (LED) can provide the known brightness identically at each sample point across the imager.

In other embodiments, the calibration process can use static multiple light sources with substantially the same light intensity for illuminating the sample points. For example, five LEDs can be used to illuminate five sample points with substantially the same intensity of light. In one embodiment, a single reference image can be captured with all the LEDs on at the same time. In another embodiment, five separate reference images can be captured with one of the LEDs on at a time, and then the reference images can be processed to provide the brightness levels of the sample points. The reference images taken in this way may be merged into a single reference image similar to the one captured with the uniform white light source described above. As noted, with respect to the movable LED embodiment, it is easier to provide five small identical light sources than one big uniform light source. A skilled artisan will appreciate that various other methods can be used to provide reference images.

Referring again to FIG. 1, at block 120, the brightness (or intensity) levels of samples points are obtained from the reference image(s). In one embodiment, the total number SP of the sample points is represented by Equation 4.

$$SP = N + 1 \quad (4)$$

In Equation 4, N is the total number of constant values in a pixel correction function used for the imager. In the illustrated embodiment in which the pixel correction function is the product of two hyperbolic cosine functions with a total of four constant values, N is 4, and thus the total number SP of the sample points is 5. Whether employing a single reference image covering the field, or multiple reference images for individual sample points, because a small number of sample points are used for the calibration, the method is less reliant on a uniformly bright, "flat" image covering the whole field.

Figure 3:
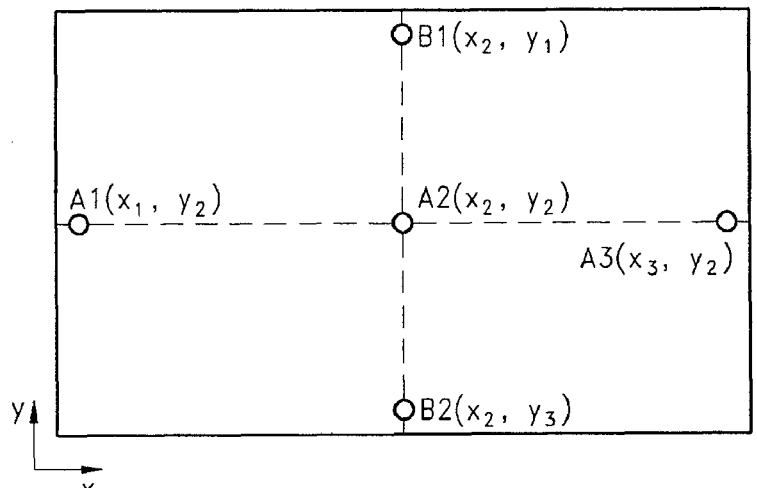
FIG. 3 is a schematic top plan view of an optical field of a digital optical device with pixel calibration sample points in accordance with one embodiment.

In one embodiment, the sample points are selected such that at least two of the sample points have the same horizontal or vertical value. Referring to FIG. 3, five sample points A1, A2, A3, B1, and B2 are selected for calibrating the pixel correction function of Equation 3. The five sample points A1, A2, A3, B1, and B2 have the following horizontal and vertical values on the reference image.

A1: $x_1, y_2$
A2: $x_2, y_2$
A3: $x_3, y_2$
B1: $x_2, y_1$
B2: $x_2, y_3$

Among the five sample points, a horizontal group or line of three sample points A1, A2, A3 have the same vertical (y) value $y_2$. A vertical group or line of three sample points B1, A2, B2 have the same horizontal (x) value $x_2$.

Figure 4A:
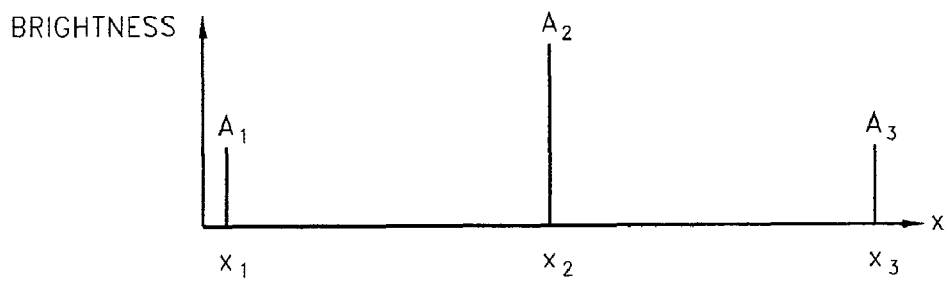
FIG. 4A is a graph illustrating brightness variations due to vignetting along the horizontal direction of the optical field of FIG. 3.
Figure 5A:
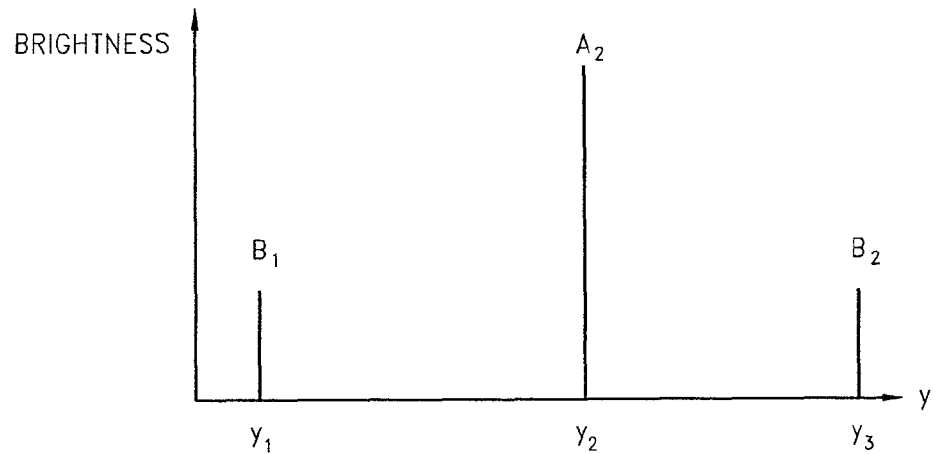
FIG. 5A is a graph illustrating brightness variations due to vignetting along the vertical direction of the optical field of FIG. 3.

The brightness levels of the horizontal group of sample points A1, A2, A3 can be obtained from the reference image (s) as shown in FIG. 4A. As shown in FIG. 4A, the sample point A2 near the center of the reference image is higher in brightness than the other sample points A1, A2 near the two side edges of the image. The brightness levels of the vertical group of sample points B1, A2, B2 can be obtained as shown in FIG. 5A. As shown in FIG. 5A, the sample point A2 near the center of the reference image is higher in brightness than the other sample points B1, B2 near the upper and lower edges of the image.

Figure 4B:
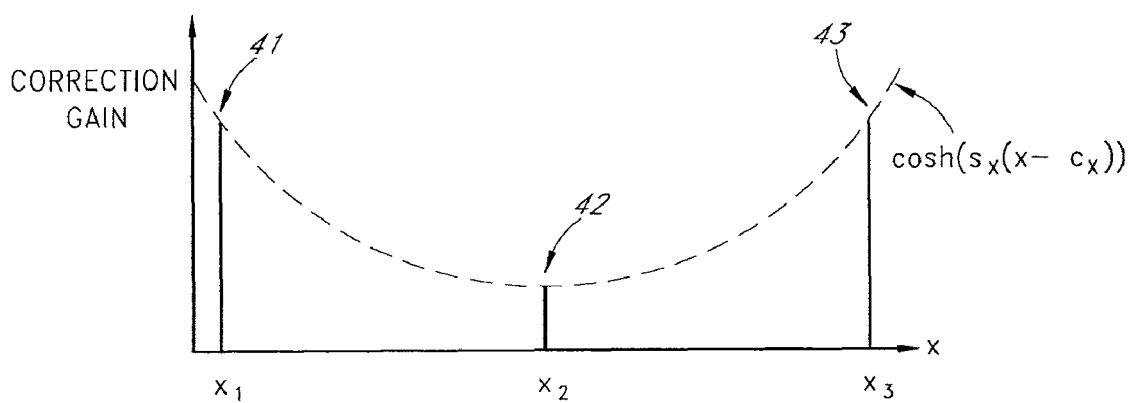
FIG. 4B is a graph illustrating one embodiment of a pixel correction function with gains to compensate for the brightness variations of FIG. 4A.
Figure 5B:
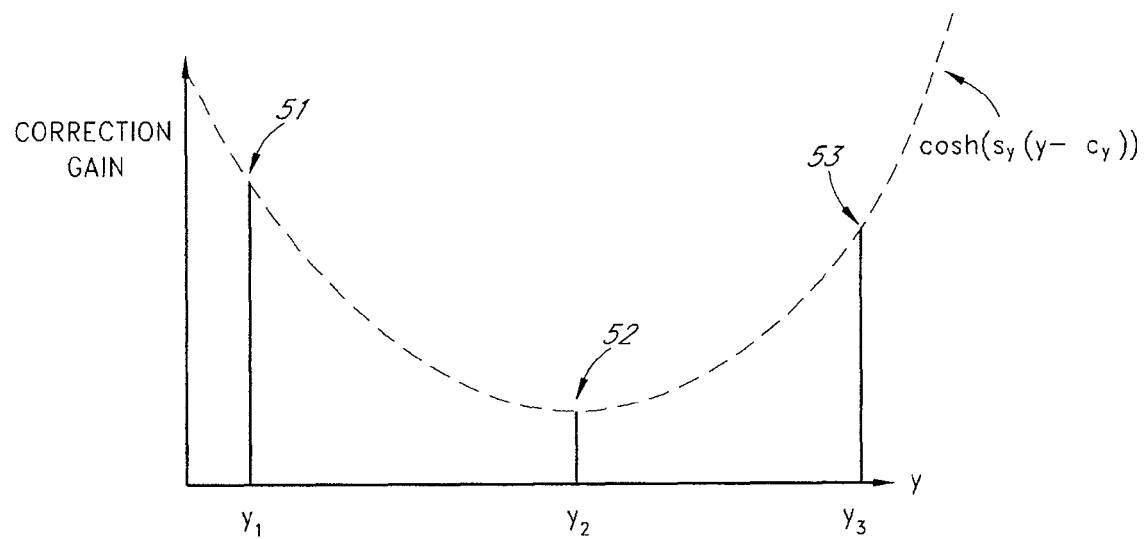
FIG. 5B is a graph illustrating one embodiment of a pixel correction function with gains to compensate for the brightness variations of FIG. 5A.

After obtaining the brightness levels of the sample points, the reciprocal values of the brightness levels are obtained at block 130. FIG. 4B illustrates correction gains which are the reciprocal values 41, 42, 43 of the brightness levels of the horizontal group of sample points A1, A2, A3. FIG. 5B illustrates correction gains which are the reciprocal values 51, 52, 53 of the brightness levels of the vertical group of sample points B1, A2, B2.

At block 140, using the reciprocal values 41, 42, 43 of the brightness levels of the horizontal group, the constant values $s_x$, $c_x$ of the horizontal component g(x) of Equation 3 can be obtained by a closed-form solution or by an iterative method (e.g., Levenberg-Marquardt method). Likewise, using the reciprocal values 51, 52, 53 of the brightness levels of the vertical group, the constant values $s_y$, $c_y$ of the vertical component g(y) of Equation 3 can be obtained by a closed-form solution or by an iterative method (e.g., Levenberg-Marquardt method). In the illustrated embodiment, the sample point A2 is in both the horizontal and vertical groups, which allows minimizing the total number of sample points for determining the constant values of the pixel correction function of Equation 3.

In another embodiment, an imager can use a pixel correction function with an overall gain factor. An overall gain factor serves to provide the absolute value of a gain applied to each pixel. On the other hand, a pixel correction function without an overall gain factor (e.g., Equation 3) may only provide normalized gains for vignetting correction. Normalized gains provide relative adjustments of values between pixels. Such a pixel correction function can be a hyperbolic cosine function represented by Equation 5.

$$g(x,y)=A*g(x)g(y)=A*\cos h(s_x(x-c_x))\cos h(s_y(y-c_y)) \quad (5)$$

In Equation 5, A is an overall gain factor, and is a constant value which can be determined by a calibration process described above in connection with FIG. 1. Other constant values $s_x$, $s_y$, $c_x$, and $c_y$ are as described above with respect to Equations 1-3. The function of Equation 5 has a total of five constant values.

In yet another embodiment, a pixel correction function with an overall gain factor can be a polynomial function represented by Equation 6.

$$f(x, y) = \sum_{i=0}^{4} \sum_{j=0}^{4} k_{ij} x^i y^j \quad (6)$$

In Equation 6, f(x, y) represents a brightness gain to be multiplied by the pixel data from a position (x, y) on a pixel array. The variable $k_{ij}$ represents the coefficients of the brightness gain; i and j are indices to k (the matrix of coefficients); (x, y) are the coordinates of the pixels.

Equation 6 has 25 unknown coefficients (or constants) because the polynomial function is in the order of 5 in both x and y directions. Equation 6 can be solved by a system of 25 linear equations using 25 sample points.

In the embodiments in which a pixel correction function includes an overall gain factor, the total number SP of the sample points for a calibration process is represented by Equation 7.

$$SP=N \quad (7)$$

In Equation 7, N is the total number of constant values in a pixel correction function with an overall gain factor. The total number SP of the sample points for the calibration process is equal to the total number of constant values in a pixel correction function used for the imager. For example, with respect to Equation 5, the total number of constant values in the pixel correction function is 5, and therefore, the total number SP of the sample points for the calibration process is also 5. With respect to Equation 6, the total number of constant values in the pixel correction function is 25, and therefore, the total number SP of the sample points for the calibration process is 25.

In the embodiments described above, only three pixel correction functions are described as examples. A skilled artisan will, however, appreciate that various other pixel correction functions can be calibrated using the calibration method described above with reference to FIG. 1.

The constant values obtained from the process described above can be stored in a memory (e.g., ROM) of the imager. The pixel correction function with the determined constant values is used in compensating for vignetting during operation of the imager.

Figure 6:
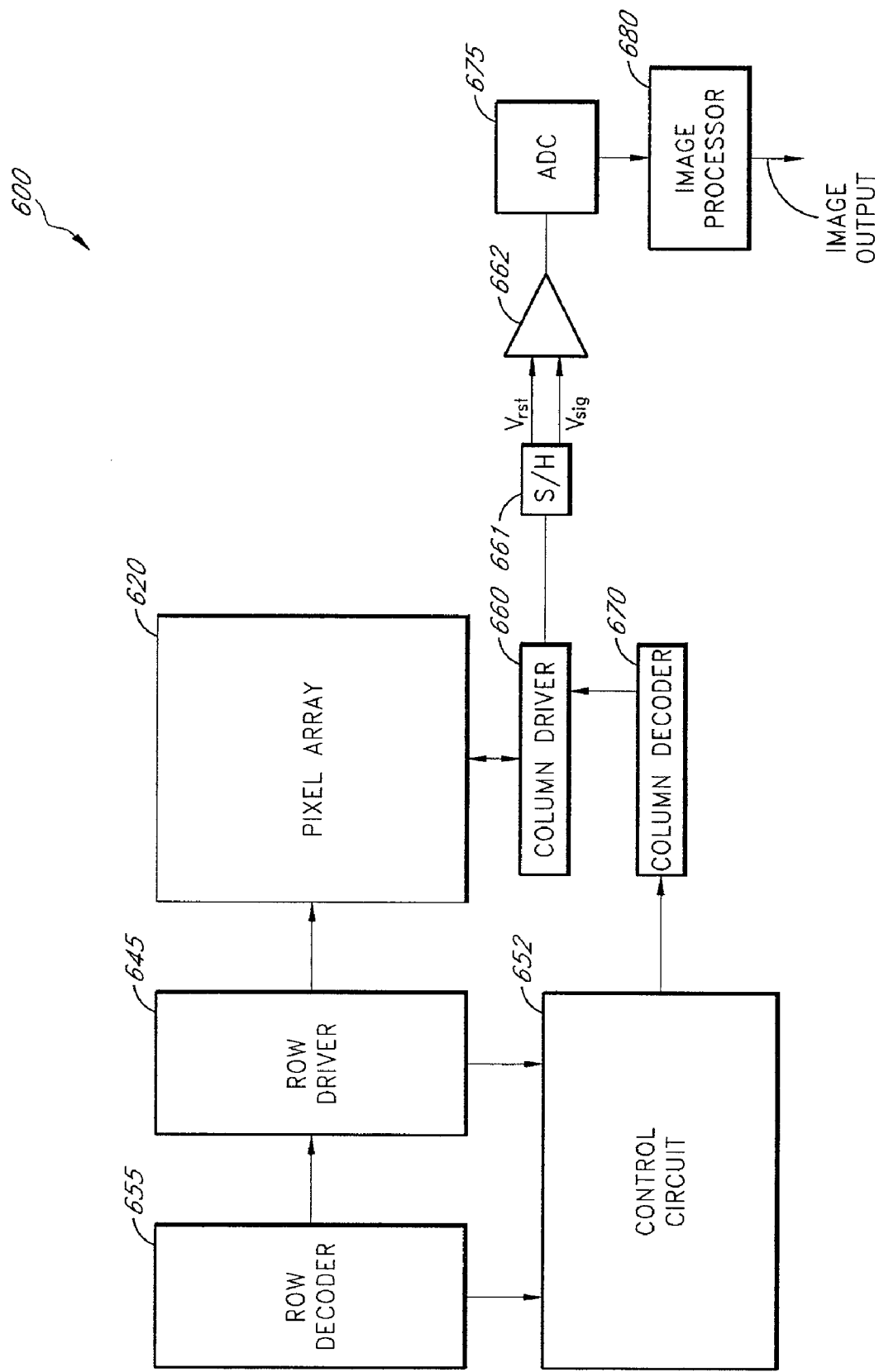
FIG. 6 is a schematic block diagram of an imager employing a pixel correction function in accordance with one embodiment.

FIG. 6 illustrates a block diagram of an imager 600 constructed in accordance with one of the embodiments described above. The illustrated imager 600 is a CMOS or semiconductor imager. The imager 600 contains an array of pixels 620 and employs a calibration method for providing a pixel correction function according to the embodiment shown in FIG. 1. Attached to the pixel array 620 is signal processing circuitry for controlling the pixel array 620. The pixel cells of each row in the array 620 are all turned on at the same time by a row select line, and the pixel cells of each column are selectively output by respective column select lines. A plurality of row select and column select lines are provided for the entire array 620. The row lines are selectively activated by a row driver 645 in response to a row address decoder 655. The column select lines are selectively activated by a column driver 660 in response to a column address decoder 670. Thus, a row and column address is provided for each pixel cell.

The imager 600 is operated by a timing and control circuit 652, which controls the address decoders 655, 670 for selecting the appropriate row and column lines for pixel readout. The control circuit 652 also controls the row and column driver circuitry 645, 660 such that they apply driving voltages to the drive transistors of the selected row and column lines. The pixel column signals, which typically include a pixel reset signal $V_{rst}$ and a pixel image signal $V_{sig}$, are output to the column driver 660, on output lines, and are read by a sample and hold circuit 661. $V_{rst}$ is read from a pixel cell immediately after the pixel cell's floating diffusion region is reset. $V_{sig}$ represents the amount of charge generated by the photosensitive element of the pixel cell in response to applied light during an integration period. A differential signal ($V_{rst}-V_{sig}$) is produced by a differential amplifier 662 for each readout pixel cell. The differential signal is digitized by an analog-to-digital converter 675 (ADC). The analog-to-digital converter 675 supplies the digitized pixel signals to an image processor 680, which forms and outputs a digital image. In one embodiment, the image processor 680 can use a pixel correction function calibrated with the method described above with reference to FIG. 1. The pixel correction function can be stored in a memory which is associated with or part of the image processor 680.

Figure 7:
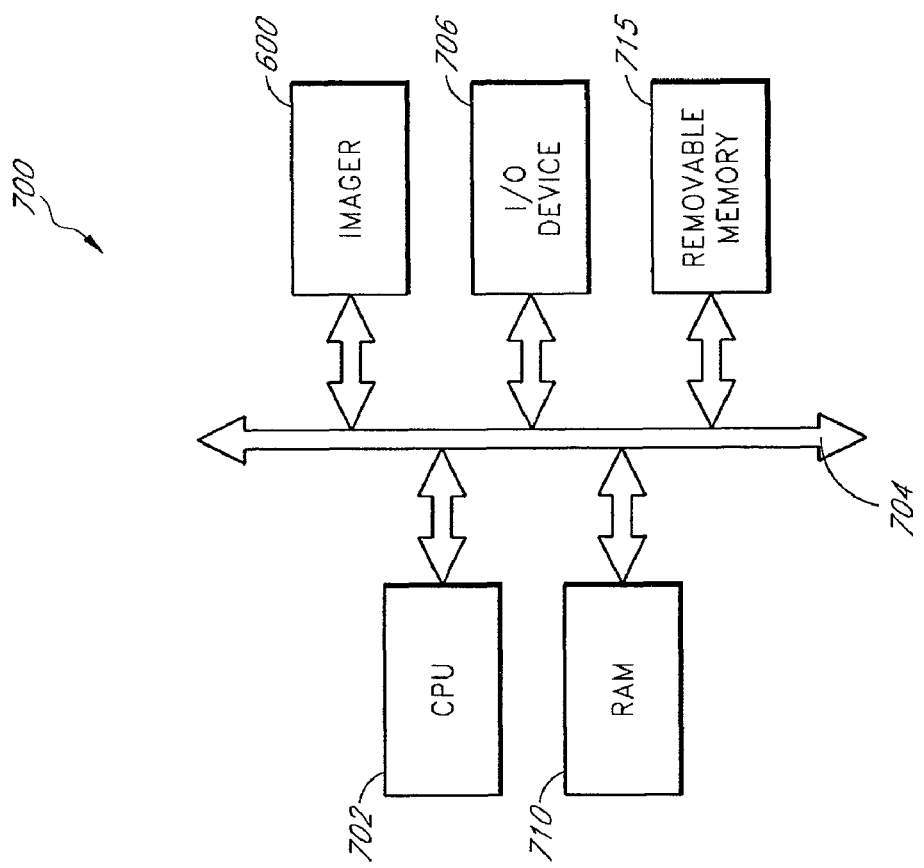
FIG. 7 is a schematic block diagram of a computer system having an imager employing a pixel correction function in accordance with one embodiment.

FIG. 7 illustrates a processor system 700 that includes an imager 600 constructed in accordance with an embodiment. As discussed above, the imager 600 contains an array of pixels and employs a method of calibrating a pixel correction function according to the embodiment shown in FIG. 1. The system 700 has digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image sensing and/or processing system.

The system 700, for example a camera system, generally includes a central processing unit (CPU) 702, such as a microprocessor, that communicates with an input/output (I/O) device 706 over a bus 704. The imager 600 also communicates with the CPU 702 over the bus 704. The processor system 700 also includes a random access memory (RAM) 710, and may include a removable memory 715, such as a flash memory, which also communicates with the CPU 702 over the bus 704. The imager 600 may be combined with a processor, such as a CPU, digital signal processor, or microprocessor, with or without memory storage on a single integrated circuit or on a different chip than the processor. In certain embodiments, the CPU 702 in conjunction with the RAM 710 or the removable memory 715 can process pixel data for vignetting correction. A skilled artisan will appreciate that it is also possible to process pixel data for vignetting correction on a separate computing device or system. The CPU 702 can use a pixel correction function calibrated with the method described above with reference to FIG. 1.

In the embodiments described above, a pixel correction function can be calibrated with a small number of sample points. This configuration allows simplifying calibration processes for individual optical devices, and thus reduces the manufacturing costs.

One embodiment is a method of calibrating a pixel correction function for compensating for vignetting in an optical device. The method includes exposing an optical device to at least one reference object so as to generate at least one reference image of the at least one reference object. The method also includes providing a pixel correction function including a first number of unknown constant values. The method further includes providing pixel data of a second number of sample points on the at least one reference image. The second number is equal to the first number or the first number plus one. The method also includes determining the constant values using the pixel data of the second number of sample points.

Another embodiment is a method of calibrating a pixel correction function for compensating for vignetting in an optical device. The method includes exposing an optical device to a reference object. The optical device includes an imager including an array of pixels. The method also includes capturing at least one image of the reference object so as to generate pixel data of the at least one image; providing pixel data of sample points taken along two intersecting lines of the at least one image; and calibrating a pixel correction function with the pixel data of the sample points.

Yet another embodiment is a method of calibrating a pixel correction function for vignetting compensation in an optical device. The method includes providing at least one reference object including a selected number of portions having substantially the same brightness simultaneously or sequentially. The method also includes capturing at least one image of the at least one reference object with an optical device so that the at least one image includes the portions of the reference object. The optical device is configured to use a pixel correction function for vignetting correction. The method further includes providing pixel data of sample points on the at least one reference image. Each of the sample points corresponds to a respective one of the portions of the reference object. The method includes calibrating the pixel correction function with the pixel data.

Another embodiment is an optical device including a lens system; an image sensor array configured to receive light passing through the lens; and a processor configured to compensate for vignetting associated with at least one of the lens and the image sensor array. The processor is configured to use a pixel correction function including a first number of constant values. The pixel correction function is calibrated by a method including: exposing the optical device to a reference object; capturing at least one image of the reference object with the image sensor array so as to generate pixel data of the image; providing pixel data of sample points taken along two intersecting lines of the image; and calibrating the pixel correction function with the pixel data of the sample points.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment may be incorporated into other embodiments as well. Accordingly, the scope of the present invention is defined only by reference to the appended claims.

What is claimed is:

1. A method of calibrating an optical device, the method comprising:

exposing an optical device to at least one reference object so as to generate at least one reference image of the at least one reference object;

providing a pixel correction function including a first number of unknown constant values, the pixel correction function being used to compensate for vignetting in the optical device, wherein the constant values comprise a scaling constant value and a location constant value, wherein the pixel correction function comprises the product of a horizontal component and a vertical component, and wherein each of the horizontal and vertical components includes the scaling constant value and the location constant value;

providing pixel data of a second number of sample points on the at least one reference image, the second number being equal to the first number or the first number plus one; and determining the constant values using the pixel data of the second number of sample points.

2. The method of claim 1, wherein the pixel data comprises brightness levels.

3. The method of claim 1, wherein providing the pixel data comprises:

providing pixel data of a first plurality of sample points along a vertical line of the image; and providing pixel data of a second plurality of sample points along a horizontal line of the image.

4. The method of claim 3, wherein one of the first plurality of sample points is identical to one of the second plurality of sample points.

5. The method of claim 1, wherein the pixel correction function is represented by Equation (a) below:

$$g(x,y)=g(x)g(y)=\cos h(s_x(x-c_x))\cos h(s_y(y-c_y)) \quad (a)$$

wherein $c_x$ and $c_y$ are constant values indicative of the horizontal and vertical centers of the image, respectively, and $s_x$ and $s_y$ are constant values indicative of the horizontal and vertical scaling factors, respectively.

6. The method of claim 5, wherein the first number is 4, and the second number is 5.

7. The method of claim 6, wherein determining the constant values comprises:
determining g(x) of Equation (a) using three sample points along a horizontal line of the image; and
determining g(y) of Equation (a) using three sample points along a vertical line of the image, wherein one of the three sample points along the horizontal line is identical to one of the three sample points along the vertical line.

8. The method of claim 1, wherein the pixel correction function further comprises an overall gain factor, and wherein the second number is equal to the first number.

9. The method of claim 8, wherein the pixel correction function is represented by Equation (b) below:

$$g(x,y)=A*g(x)g(y)=A*\cos h(s_x(x-c_s))\cos h(s_y(y-c_y)) \quad (b)$$

wherein A is an overall gain factor, $c_x$ and $c_y$ are constant values indicative of the horizontal and vertical centers of the image, respectively, and $s_x$ and $s_y$ are constant values indicative of the horizontal and vertical scaling factors, respectively; and
wherein the first number is 5, and the second number is 5.

10. The method of claim 1, wherein the pixel correction function is represented by Equation (c) below:

$$f(x,y) = \sum_{i=0}^{4}\sum_{j=0}^{4} k_{ij} x^i y^j \quad (c)$$

wherein $k_{ij}$ are constant values indicative of brightness gain, i and j are indices to k, and
wherein the first number is 25, and the second number is 25.

11. The method of claim 1, wherein determining the constant values comprises using a closed-form solution.

12. The method of claim 1, wherein determining the constant values comprises using an iterative method.

13. The method of claim 1, wherein the optical device comprises an imager including an array of pixels, and wherein exposing the optical device to the at least one reference object comprises illuminating the reference object with at least one light source such that the reference object provides substantially uniform brightness on substantially all of the pixels of the imager.

14. The method of claim 1, wherein exposing the optical device to the at least one reference object comprises illuminating the reference object with at least one light source such that portions of the reference object corresponding to the sample points have substantially the same brightness at the same time or sequentially.

15. The method of claim 14, wherein exposing the optical device to the at least one reference object comprises:
illuminating one of the portions of the reference object at a time with the at least one light source;
capturing an image of the reference object such that the image shows the one portion of the reference object; and
repeating illuminating and capturing for another of the portions of the reference object without moving the optical device relative to the reference object.

16. The method of claim 15, wherein exposing the optical device to the at least one reference object further comprises moving the at least one the light source to illuminate the other of the portions of the reference object before repeating illuminating and capturing.

17. The method of claim 15, wherein illuminating one of the portions of the reference object comprises using a plurality of light sources, each for respective ones of the portions of the reference object.

18. The method of claim 1, wherein the at least one reference object comprises at least one light source.

19. The method of claim 18, wherein the at least one light source comprises a plurality of light emitting diodes located to correspond to positions of the sample points, and wherein the light sources are turned on one at a time for each of the at least one reference images.

20. The method of claim 18, wherein the at least one light source comprises a single movable light emitting diode.

* * * * *